United States Patent [19]
Möllering

[11] 3,762,427
[45] Oct. 2, 1973

[54] METHOD AND APPARATUS FOR MIXING PRESSURE GASES PARTICULARLY FOR RESPIRATORS AND MEDICAL APPARATUS

[75] Inventor: Karl F. Möllering, Lubeck, Germany

[73] Assignee: Drägerwerk Aktiengesellschaft, Lubeck, Germany

[22] Filed: June 29, 1970

[21] Appl. No.: 50,795

[30] Foreign Application Priority Data
July 1, 1969 Germany.................. P 19 33 266.2

[52] U.S. Cl. .................................... 137/7, 137/100
[51] Int. Cl. ........................................... G05d 11/03
[58] Field of Search..................... 137/7, 100, 63 R, 137/9, 14, 101, 101.19; 128/88, 145.6, 145.8

[56] References Cited
UNITED STATES PATENTS

| | | | |
|---|---|---|---|
| 3,530,873 | 9/1970 | Arp................................. | 128/145.6 |
| 3,530,872 | 9/1970 | Arp.................................... | 137/99 |
| 3,605,785 | 9/1971 | Dobritz............................. | 137/101 |
| 3,534,753 | 10/1970 | Ollivier................................. | 137/7 |
| 3,572,364 | 3/1971 | Robens.............................. | 137/110 |
| 3,068,879 | 12/1962 | Snowman........................... | 137/100 |
| 3,273,982 | 9/1966 | McDonald............................ | 137/7 |
| 3,493,005 | 2/1970 | Kakegawa........................... | 137/100 |

*Primary Examiner*—William R. Cline
*Attorney*—McGlew and Toren

[57] ABSTRACT

A method for mixing pressure gases includes directing the gases to be mixed through throttles into a mixing pipe while the gases are maintained under pressures which are adjustable in relation to the ratio of the desired gas mixture and while the sum of the gas pressures is constant and with each gas maintained at a pressure above the critical pressure of the gas. The apparatus for carrying out the method includes an adjustable pressure reducer in each gas line which expand the gases to pressures which are always in the same ratio to each other and additional pressure reducers, arranged in each line, which are interconnected in a manner such that an increase in the pressure at the discharge of one provides a corresponding decrease at the other, and vice versa, and which expand the gases to back pressures which are in the same mixing ratio to each other each at a pressure above the critical pressure and with the sum of the pressures being constant. The passage conduits for the gas also include throttles which discharge into a common line for example, for conducting the gases to a respirator.

9 Claims, 1 Drawing Figure

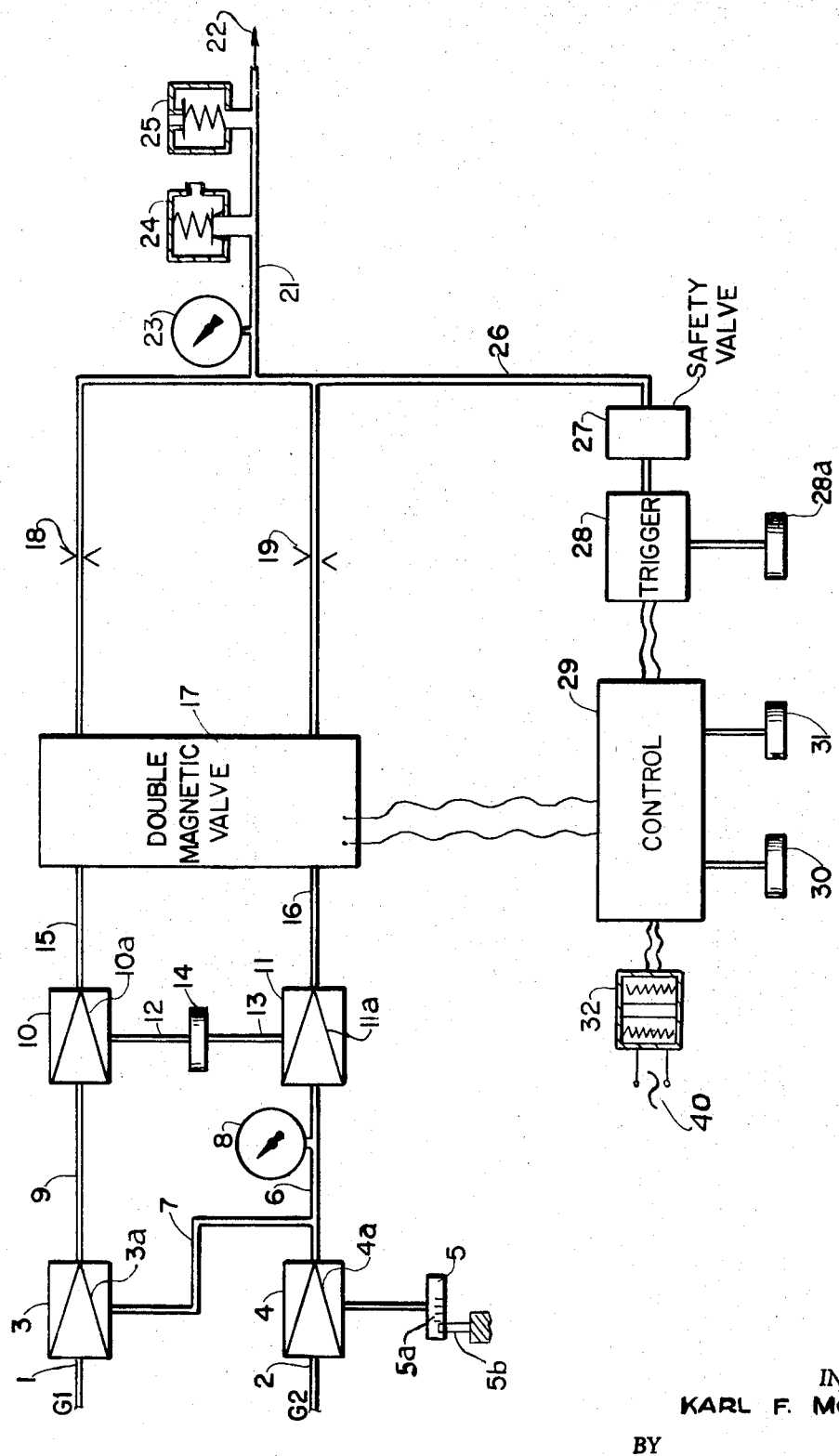

METHOD AND APPARATUS FOR MIXING PRESSURE GASES PARTICULARLY FOR RESPIRATORS AND MEDICAL APPARATUS

SUMMARY OF THE INVENTION

This invention relates in general to a method and apparatus for mixing gases and in particular, to a new and useful method and apparatus for controlling the feed of two separate gases into a combined delivery line, for example, for a medical device such as a respirator.

Methods and devices for mixing gas currents are known. One method comprises expanding two pressure gases each through a throttle valve and a flow meter in a common waste gas line where the mixing ratio of the gases to be mixed in set in the flow meters. This method has the disadvantage that the flow meters and the throttle valves must be constantly checked. In addition, one must make sure that an exactly determined pressure is always maintained in the flow meter or the reading of the flow meter will not be correct. In this method, it is thus necessary to ensure the exact maintenance of a certain outlet pressure. Another known method includes expanding two pressure gases to atmospheric pressure and then delivering the gases into piston pumps with a variable stroke volume for forced delivery into an outlet pipe. This method has the disadvantage that it requires a great number of parts such as piston pumps and drives for the pumps as well as control devices therefor.

In accordance with the present invention, there is provided a gas mixing method which permits the production of a gas mixture of two pressure gases set to a certain ratio and without the disadvantages of the prior art. The rate of flow of each gas may be set to a desired value with simple means without changing the mixing ratio. The method is particularly applicable for mixing pressure gases particularly for respirators and other medical apparatus. The invention comprises directing the gases to be mixed through separate conduits into separate throttles which discharge into a combined gas conduit in a manner such that the pressures are adjustable in the ratio of the desired mixture and the sum is maintained constant while each of the gases are maintained at a pressure above the critical pressure of the associated gas. The method of the invention has the advantage that a gas mixture of a desired concentration ratio is produced satisfactorily and with simple means and this concentration ratio does not change when the rate of flow of the gas varies. The rate of flow and the mixing ratio are determined by varying the pressures ahead of the throttles.

An apparatus for carrying out the invention includes a gas mixer which is characterized by an adjustable pressure reducer which expands the pressure gases to pressures which are always in the same pressure ratio to each other and which are arranged in combination with additional pressure reducers which are connected with each other and which expand the gases with the same pressure sum to back pressures which are in the same pressure ratio to each other and which are above the critical pressure. These pressure reducers are arranged in lines which feed through throttles to a combination line for the mixed gas. With such a mixer the back pressure of the pressure reducers and thus the rate of flow in the mixer can be set by adjusting the first pressure reducer. The pressure reducers must be so adjusted that their back pressures are always in the same ratio of pressure to each other. The mixing ratio of the gases to each other can be achieved by adjusting the other pressure reducers which are connected with each other so that the sum of the back pressures remains constant.

With the mixer of the invention, it is thus possible to set selectively the rate of flow and the mixing ratio and each of these adjustments are independent of each other. The mixer has the additional advantage that these selected adjustments are independent of the counter pressure in the mixed gas pipe. This is due to the fact that the preliminary pressure of the gases to be mixed ahead of the throttles is higher than a critical pressure.

A simple arrangement comprises the use of a pressure reducer which includes a diaphragm which is adjustable in a known manner and the diaphragm of the pressure reducer in the line of the other gas is stressed with the back pressure of the first pressure reducer. This arrangement has the advantage that in order to set the pressures ahead of the throttles in the associated gas lines, it is only necessary to adjust the residual stress of the control diaphragm of one of the pressure reducers. If the back pressure of this one pressure reducer is varied in this adjustment, the back pressures of the others are correspondingly varied in the same ratio. The apparatus can be so designed that a spindle provided with a hand wheel and with an indicator may be employed for adjusting the residual stress of the control diaphragm of a single pressure reducer to correspondingly produce an adjustment of the other pressure reducers by a corresponding proportional amount. The indicator is advantageously calibrated in liters per minute gas flow.

The apparatus also includes an additional pressure reducer arranged in each gas line which are coupled together so that the sum of the back pressures of the reducers is constant with any given adjustment. In order to be able to shut off the gas flow completely and to start it again without changing the basic mixing ratio immediately after opening the shut off valve, the construction advantageously includes jointly operated shut off valves arranged in the gas lines between the pressure reducers and the adjustable throttles.

Accordingly, it is an object of the invention to provide an improved method for mixing pressure gases, particularly for respirators and medical apparatus which comprises directing the gases through separate flow conduits and through throttles into a combination gas conduit for the mixed gas while they are maintained at pressures which are adjustable in relation to the ratio of the desired gas mixture and whose sum remains constant and which each gas is maintained above the critical pressure.

A further object of the invention is to provide a device for mixing gases which includes two separate flow lines for the gases to be combined each having a throttle with a discharge into a combination conduit for the mixed gas and wherein each line includes a first pressure reducer, one of the first pressure reducers being adjustable and the other being regulated in accordance with the back pressure of the first pressure reducer and a second pressure reducer, the second pressure reducers being coupled together for combined but opposite pressure adjustment and wherein the first pressure reducers may be operated to provide for a flow regulation of the gases and the second pressure reducers may be adjusted and controlled to regulate the mixing ratio of the gases.

A further object of the invention is to provide a gas mixing device which is simple in design, rugged in construction, and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

The only FIGURE of the drawing is the schematic diagram of an apparatus for mixing pressure gases constructed in accordance with the invention.

GENERAL DESCRIPTION OF THE PREFERRED EMBODIMENT

Referring to the drawing in particular, the invention embodied therein comprises an apparatus for mixing gases which includes a first conduit 1 for the flow of a gas G1 and a second conduit 2 for the flow of a gas G2 to be mixed with each other and which will flow through the conduits with a pressure of 10 excess atmosphere for example through the mixer.

In accordance with the invention, first pressure reducers 3 and 4 are arranged in the respective conduits 1 and 2. The first pressure reducer 4 is adjustable by the rotation of an adjustable hand wheel to vary the pressure setting on a diaphragm 4a for controlling the back pressure delivered to the conduit 6 and this back pressure in the conduit 6 is communicated through a connecting line 7 to the control diaphragm 3a of the pressure reducer 3 so that the gas delivered to the conduit 9 thereby is at a pressure which is proportional to that of the circuit 6. The hand wheel 5 is advantageously provided with indications or calibrations 5a which may be read by an indicator 5b. This indication may be read directly in flow rate, that is, in liters per minute. Another indicator in the form of a manometer 8 is also provided in the gas line 6 and its scale may also be calibrated in liters per minute. In the arrangement indicated, it is assumed that the back pressures in the conduits 6 and 9 are equal, but of course, they may be set at any desired ratio to each other. In accordance with a further feature of the invention, two additional or second pressure reducers 10 and 11 are provided in the respective conduits 6 and 9 and each carries an adjusting spindle 12, and 13, respectively, for adjusting diaphragms 10a and 11a, respectively. The coupling of the two pressure reducers 10 and 11 is so designed that when the back pressure of pressure reducer 10 is increased the back pressure of pressure reducer 11 will be correspondingly reduced. The sum of these pressures is maintained constant. The pressure reducers 10 and 11 discharge through conduits 15 and 16 respectively, to a double magnetic valve or solenoid 17 which include individual valve elements, not shown, arranged in the respective conduits 15 and 16 so that these conduits may be shut off or fully opened in accordance with actuation of the valves together from a control 29. The conduits 15 and 16 are provided with throttles 18 and 19, respectively and these throttles discharge into a mixing conduit 21 for the flow of the combined mixed gas to a respirator in a direction of the arrow 22.

When the pressure reducers 10 and 11 are adjusted by adjustment of the hand wheel 14 the mixing ratio of the gases to each other is varied but the total flow through the device is not changed. This is also true if the pressure at the outlet pipe 21 varies. In this pipe 21 the overflowing gases are mixed and conducted in the direction of the arrow 22 to a respirator (not shown) which is applied to a patient. The pressure in the outlet pipe 21 can be, for example, 10 cm of water column but it can also vary.

Connected to the pipe 21 are a respirator manometer 23, a safety valve 24, and a secondary air valve 25. A bypass pipe 26 connects to an overpressure safety valve 27 and it in turn is connected to a trigger mechanism or assembly 28 having an adjustable hand wheel 28a for setting it at a predetermined actuating amount. When the patient is breathing with aided respiration an under pressure impulse in the patient produces in a contact free switch (not shown) an electrical impulse which is transmitted to the control unit 29. The control unit 29 transmits the impulse to the double magnetic valve 17 which is opened.

In controlled respiration the control device 29 can be used to adjust the frequency and this frequency may be set by adjustment of a hand wheel 30. The ratio of the duration of inspiration time to expiration time can be adjusted with the hand wheel 31. The control device 29 is connected to a suitable source of current 40 and a transformer 32.

The method of operation of the deivce is as follows:

The rate of flow of the gas G1 and G2 to be mixed with each other is set by means of the hand wheel 5. The ratio of the pressures in th pipes 6 and 9 will be the same throughout the operation. The higher these pressures, the greater the amount which will issue from the throttles 18 and 19. The rate of flow can thus be regulated with the hand wheel 5.

The mixing ratio of the gases can be properly regulated with the pressure reducers 10 and 11 by adjusting the hand wheel 14. This is true because the gases ahead of the throttles 18 and 19 are each under a pressure above the critical pressure so that the pressure in the outlet pipe 21 will have no effect on the mixing ratio. The critical pressure ratio for diatomic gases is $$(p_2/p_1 \text{ crit.} \leq 0.53)$$

Because of the maximum respiration pressure of $p_2$ $$( p_2 \leq 1.1 \text{ at. } mu\beta )$$
$$( p_1 \geq 1.1/0.53 \text{ at } \geq 2.08 \text{ at. } )$$

As the lower limit is therefore selected $$( p_1 \geq 1.2 \text{ at. } )$$

With a corresponding modification of the mixer the pressure reducers 10 and 11 can also be arranged ahead of the pressure reducers 3 and 4.

The mixer according to the invention, has the advantage that the gas mixture fed to the patient using a respirator will always contain the same gas concentration and this gas concentration will be independent of any counter pressure. The gas concentration is also independent of any counter pressure. The gas concentration is also independent of the rate of flow so that the variations of the rate of flow have no adverse effect on the gas concentration. Regardless of how the respiration is effected, the patient always receives a mixture of the same concentration.

In the embodiment represented in the drawing the control diaphragms of the pressure reducers 10 and 11 are controlled by adjusting spindles 12 and 13 with the interposition of springs (not shown) these adjusting spindles will be shifted jointly. It will also be possible to connect the control diaphragms of the reducers 10 and 11 by springs and a rocker member (not shown) whose bearings can be displaced in the direction of the rocker. By displacing the bearing of the rocker arms of the rocker are changed so that the back pressure of the pressure reducers 10 and 11 can be varied in opposite directions, but the sum of these pressures is constant.

What is claimed is:

1. A method for mixing pressure gases, particularly for respirators and similar medical devices, comprising directing pressure gases to be mixed through separate pressure reducers to regulate the rate of flow, adjusting the back pressure of the pressure reducers so that the back pressures are always in the same ratio of pressure to each other, directing the gases through further separate pressure reducers, adjusting the further pressure reducers to expand the gases with the same pressure sum to back pressures which are in the desired ratio to each other and which are above the critical pressure, directing the gases through separate throttles and discharging the gases from the throttles into a combining conduit.

2. A method for mixing pressure gases particularly for respirators and medical apparatus using a separate conduit for the flow of each gas to be mixed which includes a first pressure reducer for each conduit with the pressure reducer of one conduit being adjustable and the pressure reducer of the conduit being regulated by the back pressure of the first conduit and a second reducer in each conduit having a means for adjusting the pressure of one regulator in a predetermined direction while the other is adjusted correspondingly in an opposite direction and also using a throttle in the conduit through which the gases are passed and discharged to a combination conduit, comprising regulating the flow rate of each gas by adjusting the first pressure reducer and to thereby also adjust the flow in the other conduit by a predetermined proportional amount, and regulating the quantities of each gas by the combined regulation of the second reducers while the sum of the quantities of the gases which move through the conduits are maintained the same.

3. A device for mixing pressure gases particularly for respirators and medical apparatus, comprising a first conduit for the flow of a pressure gas and at least one second conduit for the flow of a second pressure gas, a first pressure reducer in said first and second conduits, adjustment means associated with said first pressure reducer of one of said conduits, means for adjusting the pressure reducer of the other of said conduits by the back pressure of said first pressure reducer of said first conduit, a second pressure reducer in each of said conduits, adjusting means for each of said second pressure reducers in each of said conduits for simultaneously adjusting the pressure of said second pressure reducer in one of said conduits while the pressure reducer of the other conduit is adjusted in an equal but opposite direction, throttle means in said first conduit and said second conduit each having a discharge, and a combined conduit connected to the discharges of said throttle means for receiving the combined gases.

4. A gas mixer, according to claim 3, wherein said first pressure reducers in each conduit expand the gases to pressures which are always in the same ratio to each other, said second pressure reducers expanding the gases with the same pressure sum to back pressures which are in the same mixing ratio to each other and above the respective critical pressure.

5. A gas mixer, according to claim 4, wherein an adjustment means for said pressure reducer comprises a rotatable hand wheel and indicator means associated with said hand wheel.

6. A gas mixer, according to claim 5, wherein said indicator means is calibrated in gas flow rate.

7. A gas mixer, according to claim 3, wherein said adjustment means for said second pressure reducers comprises a rotatable hand wheel and coupling means between said hand wheel and said first pressure reducers of each of said conduits providing adjustment of said pressure reducers so that the sum of the back pressures of said reducers is constant during the adjustment.

8. An apparatus, according to claim 3, including shut off valve means arranged in each of said conduits between said pressure reducers and said throttles.

9. A device, according to claim 8, wherein shut off valve means includes a common electrical control for operating said valve means and a trigger mechanism connected to said mixing conduit and responsive to a predetermined pressure in said mixing conduit to actuate said shut off valves.

* * * * *